United States Patent
Heath et al.

(10) Patent No.: US 8,919,513 B2
(45) Date of Patent: Dec. 30, 2014

(54) BI-DIRECTIONAL OVERRUNNING CLUTCH HAVING SPLIT ROLL CAGE

(75) Inventors: Kelly P. Heath, Corning, NY (US); David C. Ochab, Horseheads, NY (US); James E. Palmer, Elmira Heights, NY (US); John R. Updyke, Horseheads, NY (US)

(73) Assignee: The Hilliard Corporation, Elmira, NY (US)

( * ) Notice: Subject to any disclaimer, the term of this patent is extended or adjusted under 35 U.S.C. 154(b) by 380 days.

(21) Appl. No.: 13/288,307

(22) Filed: Nov. 3, 2011

(65) Prior Publication Data

US 2013/0112520 A1 May 9, 2013

(51) Int. Cl.
*F16D 21/08* (2006.01)
*F16D 41/067* (2006.01)

(52) U.S. Cl.
CPC .................................. *F16D 41/067* (2013.01)
USPC .............................................. 192/50; 74/650

(58) Field of Classification Search
USPC ......................................................... 192/50
See application file for complete search history.

(56) References Cited

U.S. PATENT DOCUMENTS

| 3,124,972 | A | * | 3/1964 | Seliger et al. ................... | 74/650 |
| 3,173,309 | A | | 3/1965 | Seliger | |
| 3,283,611 | A | * | 11/1966 | Weismann et al. ............. | 74/650 |
| 3,447,396 | A | | 6/1969 | Seliger | |
| 3,581,597 | A | | 6/1971 | Reiersgaard | |
| 3,700,082 | A | * | 10/1972 | Schwab .......................... | 192/50 |
| 3,732,750 | A | * | 5/1973 | Posh .............................. | 74/650 |
| 3,935,753 | A | | 2/1976 | Williams | |
| 6,722,482 | B2 | | 4/2004 | Takuno et al. | |
| 6,722,484 | B2 | | 4/2004 | Ochab et al. | |
| 7,938,041 | B1 | * | 5/2011 | Shiigi et al. ..................... | 74/650 |
| 2013/0134006 | A1 | * | 5/2013 | Heath et al. ................. | 192/48.92 |
| 2013/0199886 | A1 | * | 8/2013 | Heath et al. ............... | 192/104 R |

* cited by examiner

*Primary Examiner* — Troy Chambers
*Assistant Examiner* — Ryan Dodd
(74) *Attorney, Agent, or Firm* — Drinker Biddle & Reath LLP (57) ABSTRACT

A bi-directional overrunning clutch includes a housing and a pair of hubs substantially coaxially aligned within the housing. A pair of roll cages position a plurality of rollers between each hub and an inner cam surface of the housing. The rollers are positioned to wedge between the hub and the inner cam surface when one of the hub and the housing is rotated with respect to the other. End caps are attached to the housing adjacent to the hubs. A friction disk mechanism includes a friction plate rotating in combination with each the roll cage and a spring compressed between the end cap and the roll cage for biasing the friction member into frictional contact with the hub. An intermittent coupler is located between each roll cage and configured to engage the roll cages so as to permit indexing of one roll cage relative to the other.

16 Claims, 11 Drawing Sheets

BI-DIRECTIONAL OVERRUNNING CLUTCH HAVING SPLIT ROLL CAGE

FIELD OF THE INVENTION

The invention relates to a clutch system, and in particular a split roll cage configuration for a bi-directional overrunning clutch for use on a primary drive axle.

BACKGROUND

Bi-directional overrunning clutches are used to control torque transmission to the right and left segments of a primary drive shaft of a wheeled machine, to provide improved cornering ability and decreased wheel slippage as compared with solid shaft drives. One such overrunning clutch is described in U.S. Pat. No. 6,722,484, which is commonly owned with the present application, and which is incorporated herein by reference in its entirety. Yet the need exists for simpler more reliable overrunning clutches for use in machinery such as snowblowers, lawnmowers, and all-terrain vehicles.

SUMMARY

An embodiment of a bi-directional overrunning clutch is disclosed having a housing and a pair of hubs substantially coaxially aligned with each other within the housing. The housing is adapted to be engaged with and rotated by a drive mechanism, and includes an inner cam surface. The hubs are adapted to engage first and second shafts of a primary drive axle. A roller assembly is associated with each hub, each roller assembly including a roll cage having a set of slots positioning a plurality of rollers in an annular space between the hub and the inner cam surface of the housing. The rollers surrounding each hub are spaced about an associated hub and adapted to wedgingly engage between the hub and the inner cam surface when one of the hub and the housing is rotated with respect to the other of the hubs. An end cap is associated with each hub and attached at each end of the housing. A friction disk mechanism is associated with each hub and roller assembly for indexing roller assembly relative to the hub, each friction disk mechanism including a friction plate and a spring. The friction plate is engaged with or formed on the roll cage so as to rotate in combination with the roll cage, and is positioned to contact a contact surface on the hub. The spring is compressed between the end cap and the roll cage for biasing the friction member into frictional contact with the contact surface of the hub. A roll cage intermittent coupler engages both of the roll cages to allow the roll cages to rotate relative to each other, while enabling each roll cage to move axially with respect to its associated hub. The inner cam surface has a forward cam surface and a reverse cam surface, such that when the housing is being driven with respect to at least one of the hubs, the rollers wedgingly engage between the forward cam surface and the at least one hub. When one of the hubs is overrunning by rotating faster than the housing and the other of the hubs, the roll cage coupling prevents the roll cage associated with the one hub from rotating with the one hub, thereby limiting the ability of the rollers to wedgingly engage between the reverse cam surface of the housing and the one hub.

Another embodiment of a bi-directional overrunning clutch is disclosed having a housing and first and second hubs substantially coaxially aligned with each other within the housing. The housing is adapted to be engaged with and rotated by a drive mechanism and includes an inner cam surface. A first roll cage having a set of slots positions a plurality of rollers in an annular space between the first hub and the inner cam surface of the housing, and a second roll cage having a set of slots positions a plurality of rollers in an annular space between the second hub and the inner cam surface of the housing. The rollers surrounding each hub are spaced about an associated hub and adapted to wedgingly engage between the hub and the inner cam surface when one of the hubs and the housing is rotated with respect to the other of the hubs and the housing. A first end cap is attached to the housing adjacent to the first hub and a second end cap is attached to the housing adjacent to the second hub. A first friction disk mechanism engages the first roll cage for indexing the first roll cage relative to the first hub, the first friction disk mechanism including a first friction plate engaged with or formed on the first roll cage so as to rotate in combination with the first roll cage and positioned to contact a contact surface on the first hub. The first friction disk mechanism further includes a first spring compressed between the first end cap and the first roll cage for biasing the first friction member into frictional contact with the contact surface on the first hub. A second friction disk mechanism engages the second roll cage for indexing relative to the second roll cage to the second hub, the second friction disk mechanism including a second friction plate engaged with or formed on the second roll cage so as to rotate in combination with the second roll cage and positioned to contact a contact surface on the second hub. The second friction disk mechanism further includes a spring compressed between the second end cap and the second roll cage for biasing the second friction member into frictional contact with the contact surface on the second hub. A roll cage intermittent coupler engaging both roll cages to allow the roll cages to rotate relative to each other, while enabling each roll cage to move axially with respect to its associated hub.

In a bi-directional overrunning clutch, an embodiment of an indexing assembly is disclosed. The clutch includes a housing adapted to be engaged with and rotated by a drive mechanism, the housing having an inner cam surface; a first hub and a second hub substantially coaxially aligned with each other within the housing; first and second roll cages each having a set of slots positioning a plurality of rollers in an annular space between the first and second hubs, respectively, and the inner cam surface of the housing, the rollers surrounding each hub being wedgingly engaged between the hub and the inner cam surface when one of the hubs and the housing is rotated with respect to the other of the hubs and the housing; and first and second end caps attached to the housing adjacent to the first and second hubs, respectively. The indexing assembly includes first and second friction disk mechanisms for indexing the first roll cage relative to the first hub and the second roll cage relative to the second hub, respectively. Each friction disk mechanism includes a friction plate engaged with or formed on the roll cage so as to rotate in combination with the roll cage and positioned to contact a contact surface on the associated hub, a spring compressed between the end cap and the roll cage for biasing the friction member into frictional contact with the contact surface on the hub. A roll cage intermittent coupler is located between each roll cage. The coupler is configured to engage the roll cages so as to permit indexing of one roll cage relative to the other while enabling each roll cage to move axially with respect to its associated hub.

In one embodiment, the coupler includes a coupler hub with radially extending coupler teeth. Each coupler tooth has a length and width designed to position the coupler tooth in a corresponding slot in both cages. The width of the coupler tooth is less than the width of the associated slots so as to define a gap that permits one roll cage to index with respect to the other roll cage and the coupler tooth. The gap is preferably sized so that one roll cage can index so as to position its rollers to engage with one of either the forward or rear cam surfaces, while the coupler teeth prevent the other roll cage from indexing in the opposite direction thereby preventing its rollers from engaging with the other of either the forward or rear cam surfaces.

BRIEF DESCRIPTION OF DRAWINGS

For the purpose of illustrating the invention, there are shown in the drawings embodiments that are presently preferred; it being understood, however, that this invention is not limited to the precise arrangements and constructions particularly shown.

DETAILED DESCRIPTION

An embodiment of a bi-directional overrunning clutch 10 is shown in FIGS. 1-5A. The clutch 10 includes a housing 12 and a flange 14 affixed to the housing 12. The flange 14 is adapted to receive an input gear or sprocket that is engaged with an external drive mechanism for imparting rotational movement to the flange 14 and thus to the housing 12. As depicted, the flange 14 includes bolt holes 16 for attaching the gear, it being understood that the gear may be attached to the flange 14 by any mechanical means known in the art, or may be formed as an integral part of the flange 14 or housing 12. When the drive mechanism rotates the gear, the flange 14 rotates, which in turn rotates the housing 12.

Figure 4:
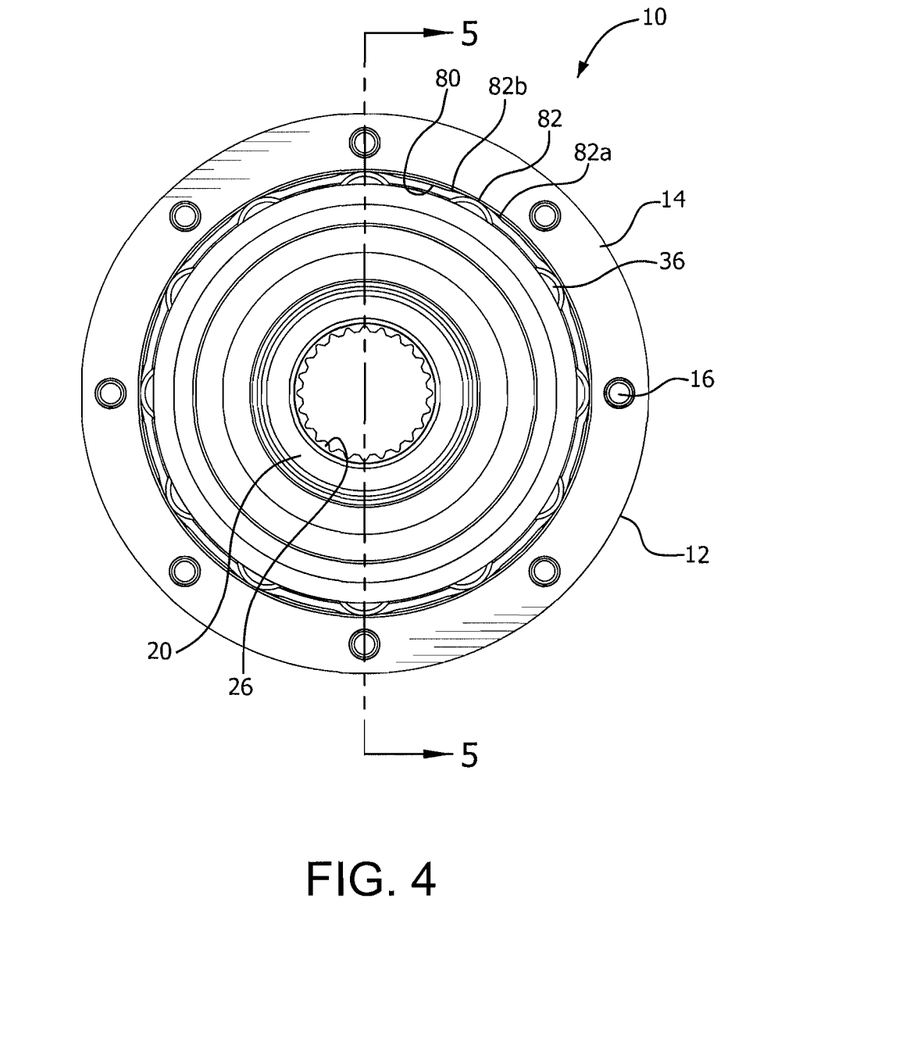
FIG. 4 is an end view of the partially assembled clutch of FIG. 3.
Figure 4A:
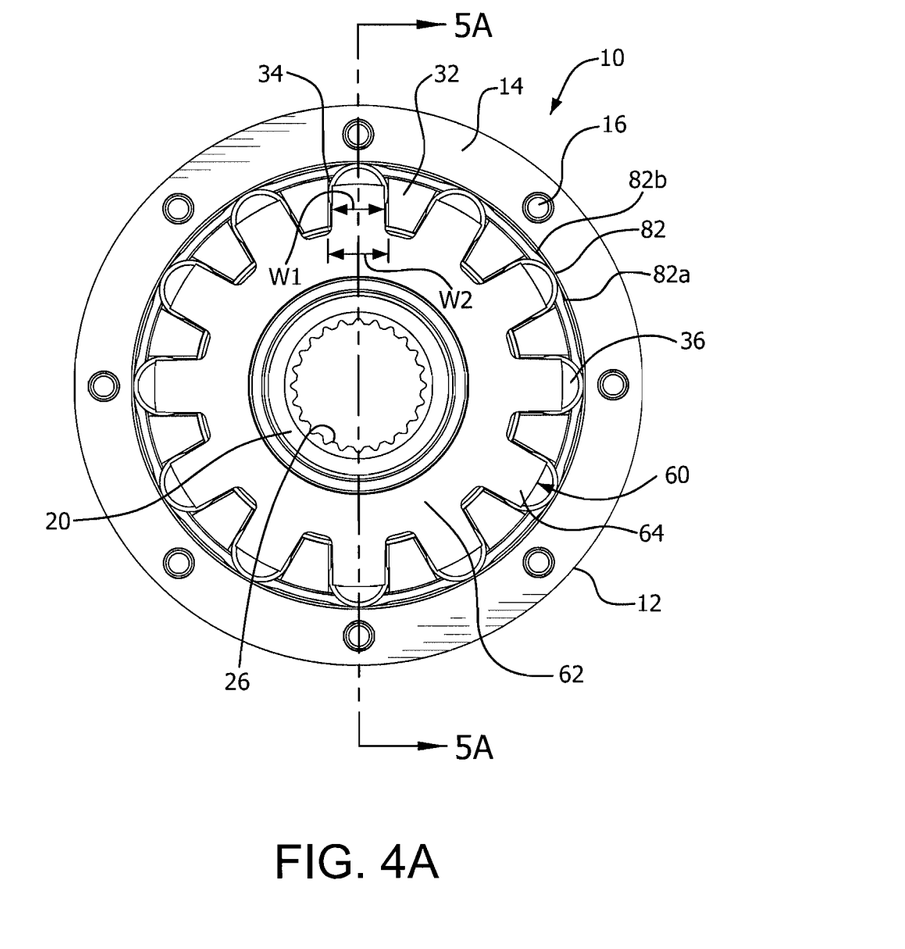
FIG. 4A is an end view of the partially assembled clutch of FIG. 3A.

As shown in FIGS. 4 and 4A, the housing 12 includes a substantially cylindrical inner surface 80. The inner surface 80 includes a plurality of an inner cam surfaces 82 including forward and reverse cam surfaces 82a, 82b. Depending on the desired direction of rotation of the housing 12, either surface 82a, 82b may be interchangeably considered as a forward or a reverse cam surface.

Figure 1:
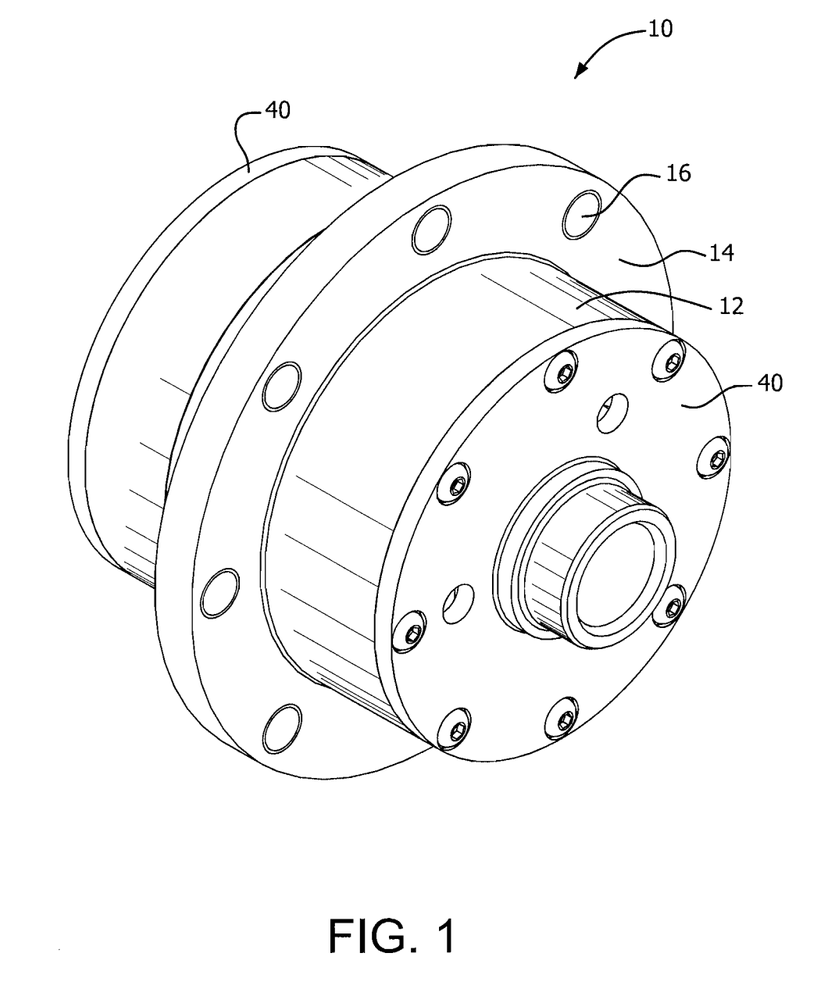
FIG. 1 is a perspective view of an embodiment of a bi-directional overrunning clutch.
Figure 2:
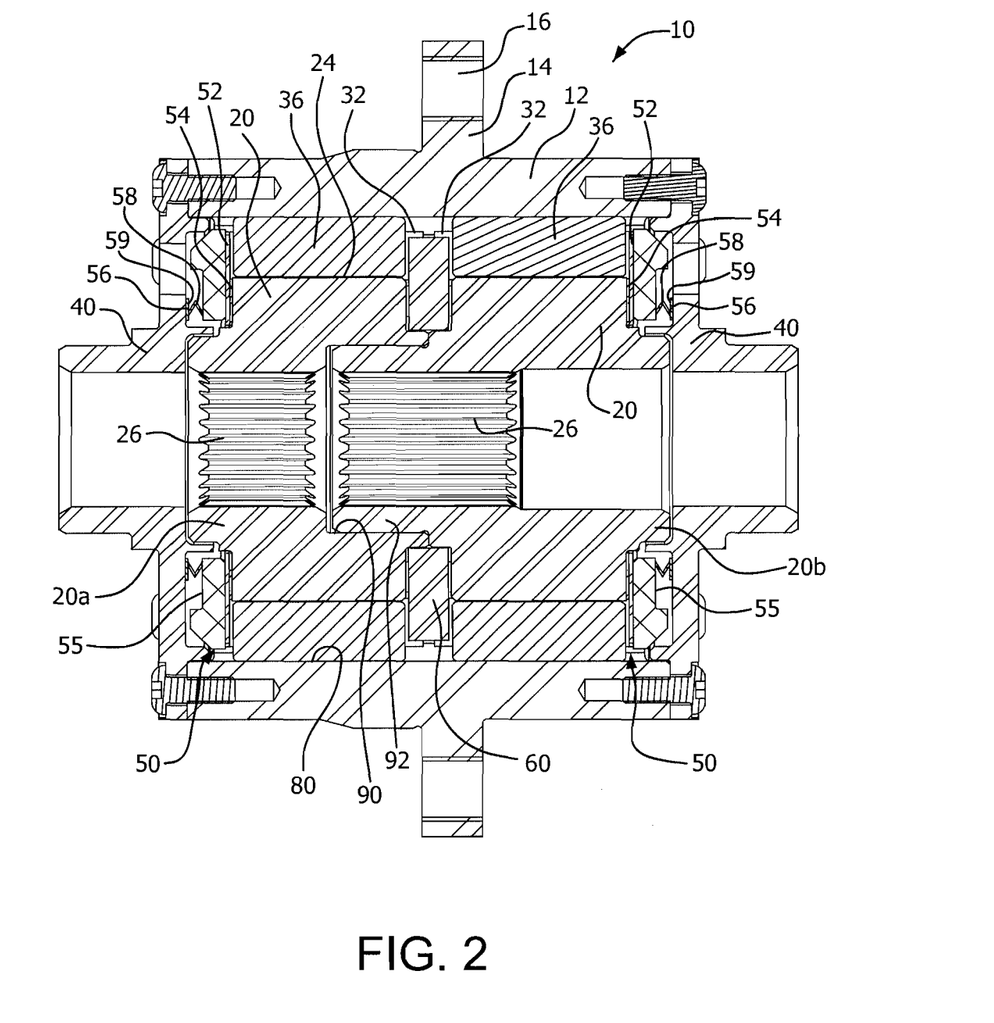
FIG. 2 is a cross-sectional view of the clutch of FIG. 1.
Figure 3:
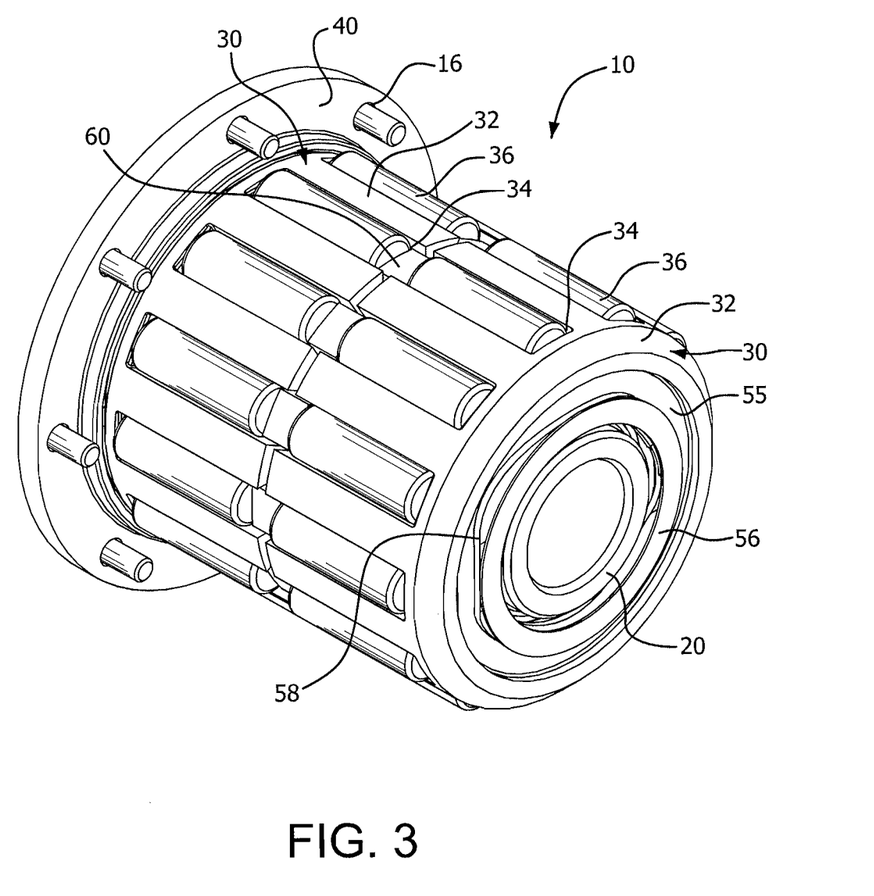
FIG. 3 is a perspective view of the clutch of FIG. 1 with the housing and one end cap removed.
Figure 3A:
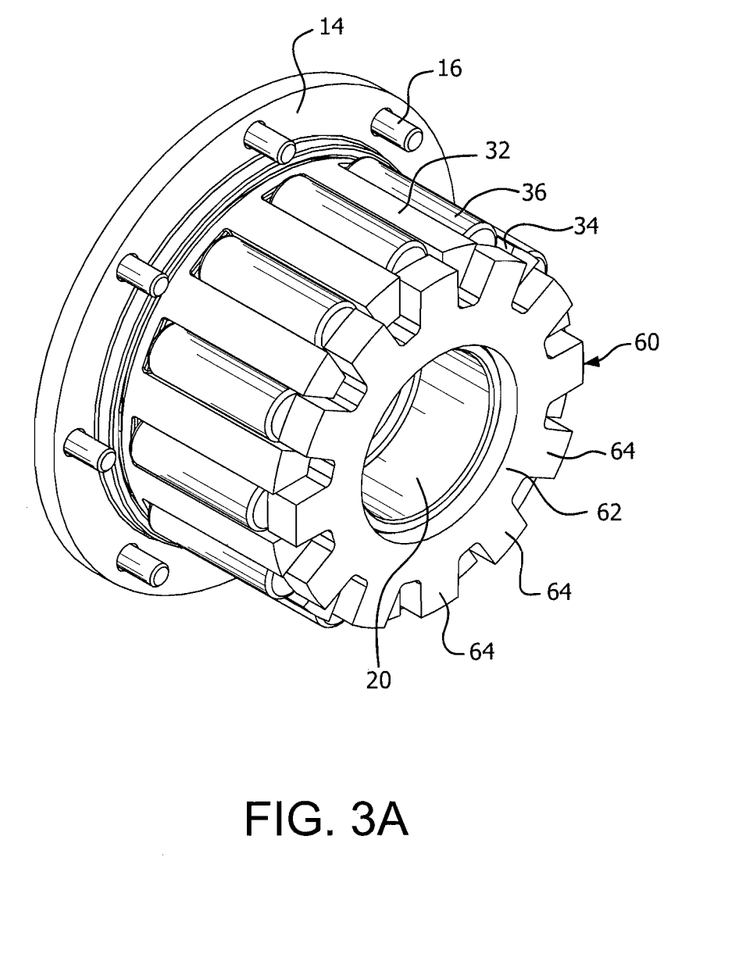
FIG. 3A is a perspective view of the clutch of FIG. 3 with one of the roll cages and hubs removed.
Figure 5:
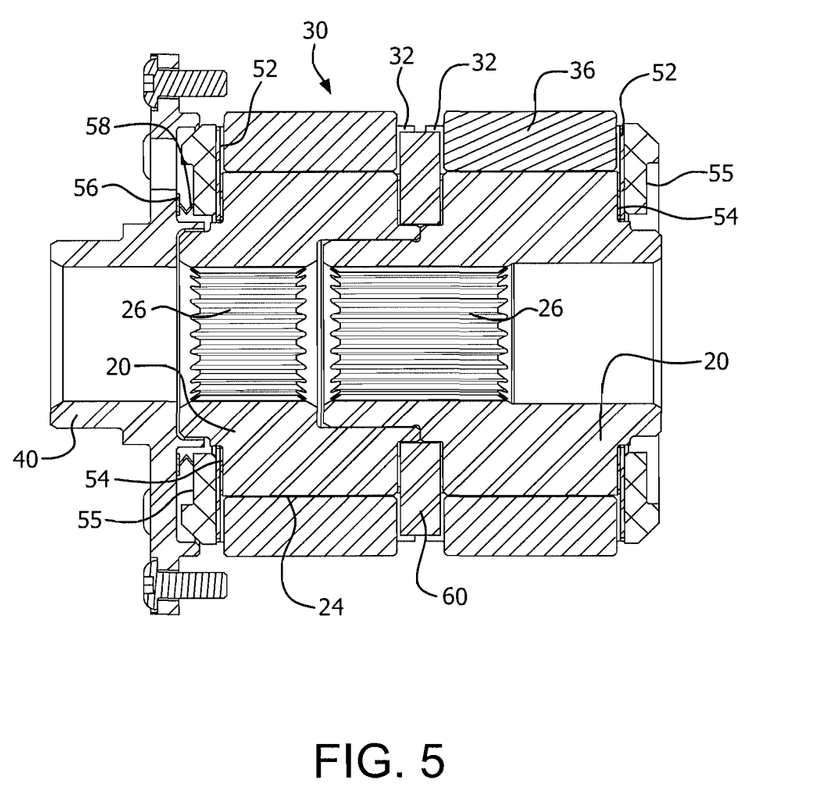
FIG. 5 is a cross-sectional view of the partially assembled clutch of FIG. 3 taken along section 5-5 in FIG. 4.
Figure 5A:
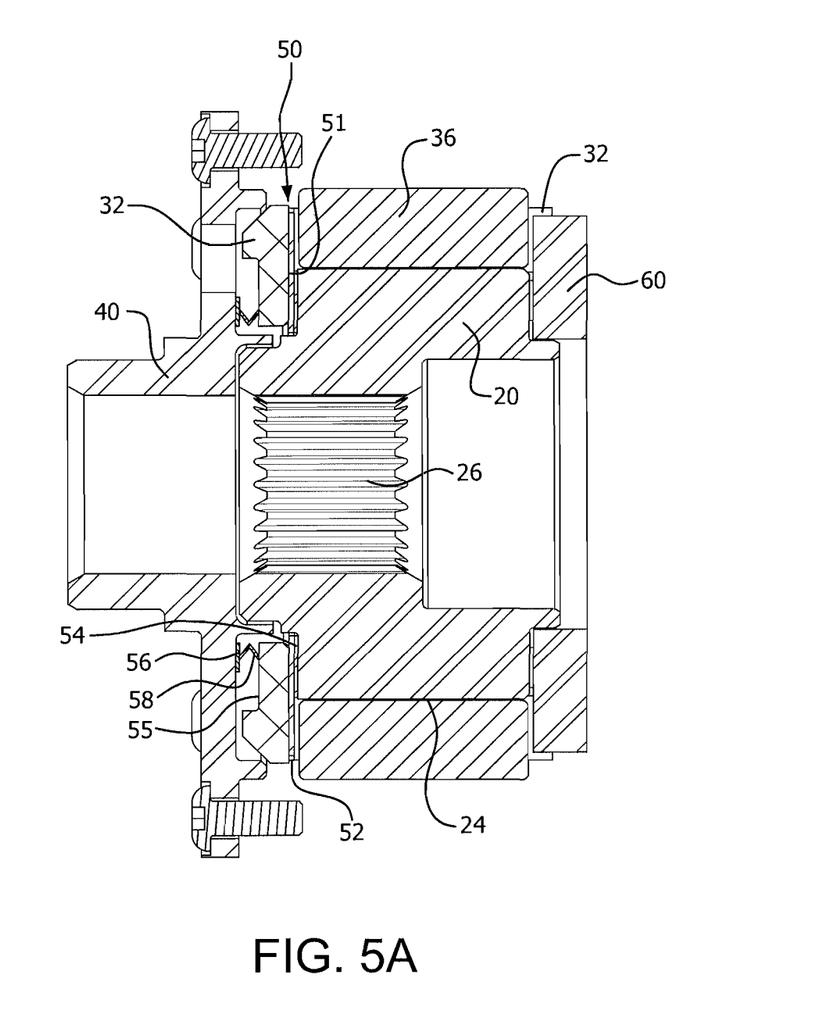
FIG. 5A is a cross-sectional view of the partially assembled clutch of FIG. 3A taken along section 5A-5A in FIG. 4A.

As shown in FIGS. 2 and 5, a pair of hubs 20 is located within the housing 12. The hubs 20 are substantially coaxially aligned with each other within the housing 12, and are each adapted to rotate about their common axis within the housing 12. In the depicted embodiment of FIG. 2, the hubs 20 are not identical, but rather are mated to ensure their axial alignment. In particular, a first hub 20a includes a substantially cylindrical socket 90 while a second hub 20b includes a substantially cylindrical axial protrusion 92 adapted to be received into the socket 90.

The first hub 20a is adapted to engage an end of a first shaft of a primary drive axle (not shown) and the second hub 20b is adapted to engage an end of a second shaft of the primary drive axle (not shown). Each hub 20 has a substantially cylindrical outer surface 24 having a diameter smaller than the diameter of the inner surface 80 of the housing 12, so that an annular space is formed between the outer surface 24 of the hubs 20 and the inner surface 80 of the housing 12. Each hub 20 preferably has an internal bore 26 into which a portion of a primary drive axle shaft is received. In the depicted embodiment, the internal bores 26 include splines to allow the shafts to move axially inward and outward with respect to the hubs 20 while ensuring that each shaft will rotate along with its respective hub 20. In other embodiments, other mechanical connections between each shaft and its respective hub 20 may be used to ensure rotational coupling. It is further contemplated that the hubs 20 may be formed integrally with the primary drive shafts.

A pair of roller assemblies 30 is located within the housing 12, with a portion of each roller assembly 30 being situated in the annular space between the outer surface 24 of one of the hubs 20 and the inner surface 80 of the housing 12. As shown in detail in FIGS. 3 and 4A, each roller assembly 30 includes a roll cage 32 formed in a substantially cylindrical shape. Each roll cage 32 corresponds to one of the hubs 20 and has a set of slots 34 spaced around the circumference of the roll cage 32. Each slot 34 is adapted to receive a cylindrical roller 36. Collectively, the slots 34 of one roll cage 32 position a plurality of rollers 36 in the annular space between the first hub 20a and the inner cam surface 82 of the housing 12, and the slots 34 of the other roll cage 32 positions a plurality of rollers 36 in the annular space between the second hub 20b and the inner cam surface 82 of the housing 12. In one embodiment, each set of rollers 36 has ten rollers, it being understood that any number of rollers greater than or equal to three may be used. As shown, each roller 36 is substantially cylindrical, but rollers of other shapes may be used, including but not limited to substantially spherical rollers.

The rollers 36 surrounding each hub 20 are adapted to be wedgingly engaged between the hub 20 and the inner cam surface 82 of the housing 12 when the associated hub 20 and the housing 12 are rotated with respect to the other. In particular, when the housing 12 is rotationally driven by an external drive mechanism at a speed faster than the hubs 20 are rotating, the rollers 36 are designed to wedgingly engage between the forward cam surfaces 82a in the housing and the outer surfaces 24 of the hubs 20, causing the hubs 20 to rotate with the housing 12. Similarly, when both hubs 20 are rotating faster than the housing 12, such as during a descent or deceleration, the hubs 20 cause the rollers 36 to wedge between the reverse cam surfaces 82b and the outer surfaces 24 of the hubs 20. The reverse cam surface engagement enables an engine braking or back driving effect, when available, whereby the reduced speed of the input gear slows or brakes the drive axles.

Providing two separate roller assemblies 30, each having a set of rollers 36 associated with one of the hubs 20, allows overrunning of one hub 20 while maintaining positive driving engagement of the other hub 20. For example, in a wheeled vehicle in which the hubs 20 drive wheels on opposite sides of the vehicle, when the vehicle travels around a curve, the wheel on the inside of the curve has a shorter distance to travel, and thus travels at a slower speed, than the wheel on the outside of the curve. Consequently, when the housing 12 is being rotationally driven while the vehicle is in a curve, the one hub 20, for example hub 20a, associated with the inside wheel will continue to be driven, with its respective rollers 36 engaged between the outer surface 24 of the hub 20a and the forward cam surfaces 82a of the inner surface 80 of the housing 12, while the other hub 20, for example hub 20b, associated with the outside wheel will be allowed to overrun, turning faster than the housing 12, such that its respective rollers 36 disengage from their wedging between the inner cam surfaces 82 and the outer surface 24 of the hub 20b, thus allowing the hub 20b to freely rotate as it is driven by the outer wheel. When the vehicle returns to a straight path and the speed of the disengaged hub 20b slows down to equal the speed of the housing 12, the rollers 36 surrounding the hub 20b re-engage (wedge) between the forward cam surfaces 82a and hub 20b so that the hub 20b is once again driven to rotate at the same speed as the housing 12.

However, since the current clutch uses a split roll cage, if the two roll cage assemblies 30 were completely decoupled, there is the potential that the rollers 36 associated with the overrunning hub 20b could go into reverse engagement with the reverse cam surfaces 82b of the inner surface 80 of the housing 12, thereby causing the vehicle to act as if it has a solid axle (i.e., one axle being driven by the housing 12, while the other axle tries to drive the housing 12). To overcome potential reverse engagement of an overrunning hub 20, the clutch 10 includes a roll cage coupler 60 positioned between the two roll assemblies 30, as shown in FIGS. 2, 3, 3A, 4A, 5, and 5A. The coupler 60 includes a hub 62 with a plurality of teeth 64 extending radially outward from the hub 62. The number of teeth 64 preferably matches the number of slots 34 and the number of rollers 36 in each roll cage 32. As shown most clearly in FIGS. 5 and 5A, the teeth 64 of the coupler 60 preferably fit into the slots 34 in each roll cage 32. As shown in FIG. 4A, the width W1 of the portion of each tooth 64 within a slot 34 is slightly less than the width W2 of the slot 34 of the roll cages 32 such that a gap exists. This gap is designed to permit a roll cage 32 to shift or index as discussed herein so that the rollers 36 are positioned to engage with the cam surface, but the gap is not large enough to permit the other roll cage 32 to index in the opposite direction. Accordingly, by using an intermittent coupler 60, the present split cage design of the present invention prevents the issue of one set of rollers engaging the forward cam surface to drive one axle and the other set of rollers engaging the reverse cam surface to be driven by the other axle.

Rotationally coupling together two separate roll cages 32 with an intermittent coupler 60 allows each roll cage 32 to move axially with respect to its associated hub 20, which enables a compact and simple friction disk mechanism to index each roll cage 32 relative to its associated hub 20, as discussed in detail below. The intermittent coupler also allows for a large torque difference from one axle to the other, and also allows for larger manufacturing tolerances in the clutch cam profile and hub diameters. The intermittent coupler also provides a method for retaining the roll assemblies in axial position so to prevent one set from contacting the other.

An end cap 40 is attached to each end of the housing 12 so as to rotate with the housing 12. To assist in indexing the roll cage assemblies 30 to their corresponding hubs 20, each end cap 40 is associated with a friction disk mechanism 50, shown in detail in FIGS. 2, 3, 5, and 5A. Each friction disk mechanism 50 creates a frictional engagement between its associated roll cage assembly 30 and hub 20 so that roll cages 32 rotate with the hubs 20 when both hubs 20 are rotating. In combination, the friction disk mechanisms 50 and the roll cage coupler 60 make up an indexing assembly.

In particular, when a wheeled vehicle is stationary such that the hubs 20 are stationary, and rotational movement is applied to the housing 12 via an external drive mechanism, the housing 12 begins to rotate with respect to the hubs 20. The friction disk mechanisms 50 prevent the roll cage assemblies 30 from rotating with respect to the hubs 20 (thus indexing the roll cage assemblies 30 relative to the housing 12). Indexing places the rollers 36 in position so that they can wedgingly engage between the forward cam surfaces 82a and the hub 20. Once the rollers 36 are wedgingly engaged, the housing 12, the roll cages 32, and the hubs 20 all rotate together, and the rollers 36 remain non-rotating about their own axes.

During overrunning of one hub 20, for example, hub 20a, the friction of each friction disk mechanism 50 continues to hold its associated roll cage assembly 30 in position relative to the housing 12. The speed of the overrunning hub 20a, however, is faster than the speed of the roll cage 32, thus causing the hub 20a to drive the rollers 36 in the roll cage assembly 30 associated with the hub 20a out of their wedging engagement so that the hub 20a can rotate faster than the housing 12. At this point the rollers 36 in the roll cage assembly 30 associated with hub 20a are free to rotate about their own axes. The other hub 20, hub 20b, continues to be driven at the same rotational speed as the housing 12, with its corresponding rollers 36 wedged into engagement. The roll cage coupler 60 couples the two roller assemblies 30 so that both remain engaged to the driven (non-overrunning) hub 20b, thereby preventing either or both of the roller assemblies 30 from indexing from forward engagement of the rollers 36 into reverse engagement. The gap between the intermittent coupler and roll cages (difference between W2 and W1) is designed to allow limited movement for proper function within the assembly system.

Each friction disk mechanism 50 may include a friction plate or disk 52 that is attached to, formed on, or engaged with the roll cage 32 so as to rotate in combination with the roll cage 32. The friction plate 52 can be permanently or removably attached to the roll cage 32, or may simply be a surface on the roll cage 32. In one embodiment, the friction plate 52 is a substantially planar annular ring with radially extending tabs or teeth that are sized to extend into the slots 34 on the roll cage 32 when the friction plate 52 is placed within the roll cage 32 and adjacent to an inside end surface 51 of the roll cage 32. The friction plate 52 is configured to engage with a portion of the hub 20. More specifically, in one embodiment, the hub 20 includes a contact surface 54, which may be integral with, formed on, or attached to the hub, preferably on an axial end surface of the hub so as to be adjacent to a portion of the friction plate 52. The portions of the friction plate 52 and contact surface 54 that contact one another preferably have a sufficient coefficient of friction to create frictional contact for transferring torque between the two as contemplated by the present invention.

A spring 58 is compressed between a bearing 56 and an outer surface 55 on the roll cage 32. In the depicted embodiment, the spring 58 is a wave spring. The spring 58 biases the roll cage 32, and thus the friction plate 52, into the contact surface 54 of the hub 20. As such, the spring 58 causes the roll cage 32 to move axially with respect to the hub 20, thereby urging the friction plate 52 into frictional engagement with the hub 20. To inhibit or prevent torsional forces from being imposed on the spring 58 by the end cap 42, the bearing 56 may include at least one low friction coefficient surface 59. In one embodiment, the low friction coefficient surface 59 is on a side of the contact surface that engages with the spring 58, such that if the bearing 56 were to rotate along with the end cap 42, the bearing 56 would impose only minimal torsional loading on the spring 58. In another embodiment, the low friction coefficient surface 59 is on a side of the contact surface that engages with the end cap 42. As such, the low friction coefficient surface 59 substantially prevents the bearing 56 from rotating with the end cap 42. In another embodiment, the low friction coefficient surface 59 may be on both sides of the bearing 56 and is in contact with both the spring 58 and a portion of the end cap 42. In one preferred embodiment, the bearing 56 is a thrust washer or thrust bearing that permits rotational motion between the spring 58 and the end cap 42. In another embodiment, the bearing 56 is an annular ring of sufficient strength to provide rigid support for the spring 58.

Figure 6:
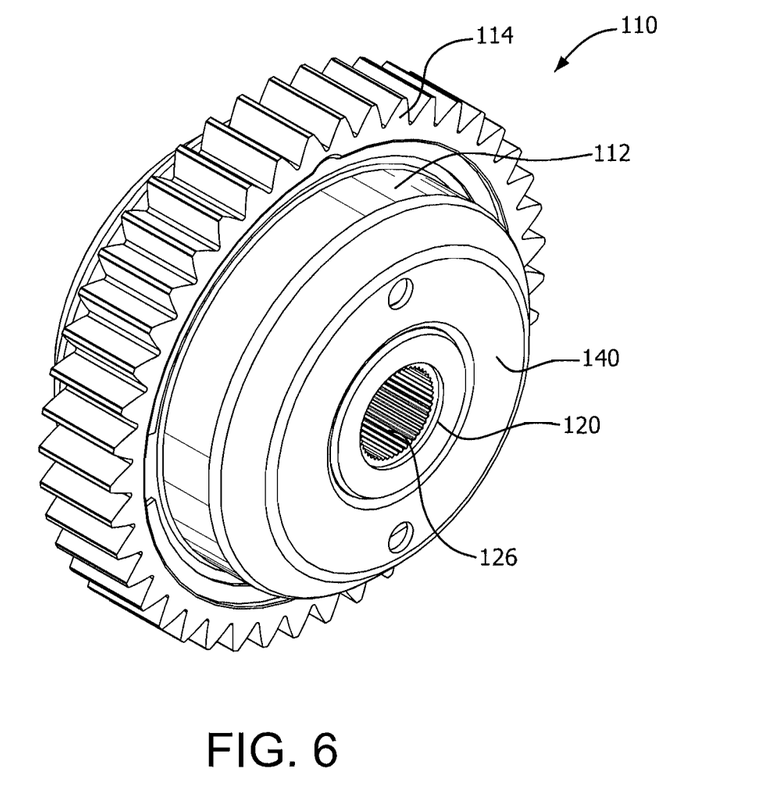
FIG. 6 is a perspective view of another embodiment of a bi-directional overrunning clutch.
Figure 7:
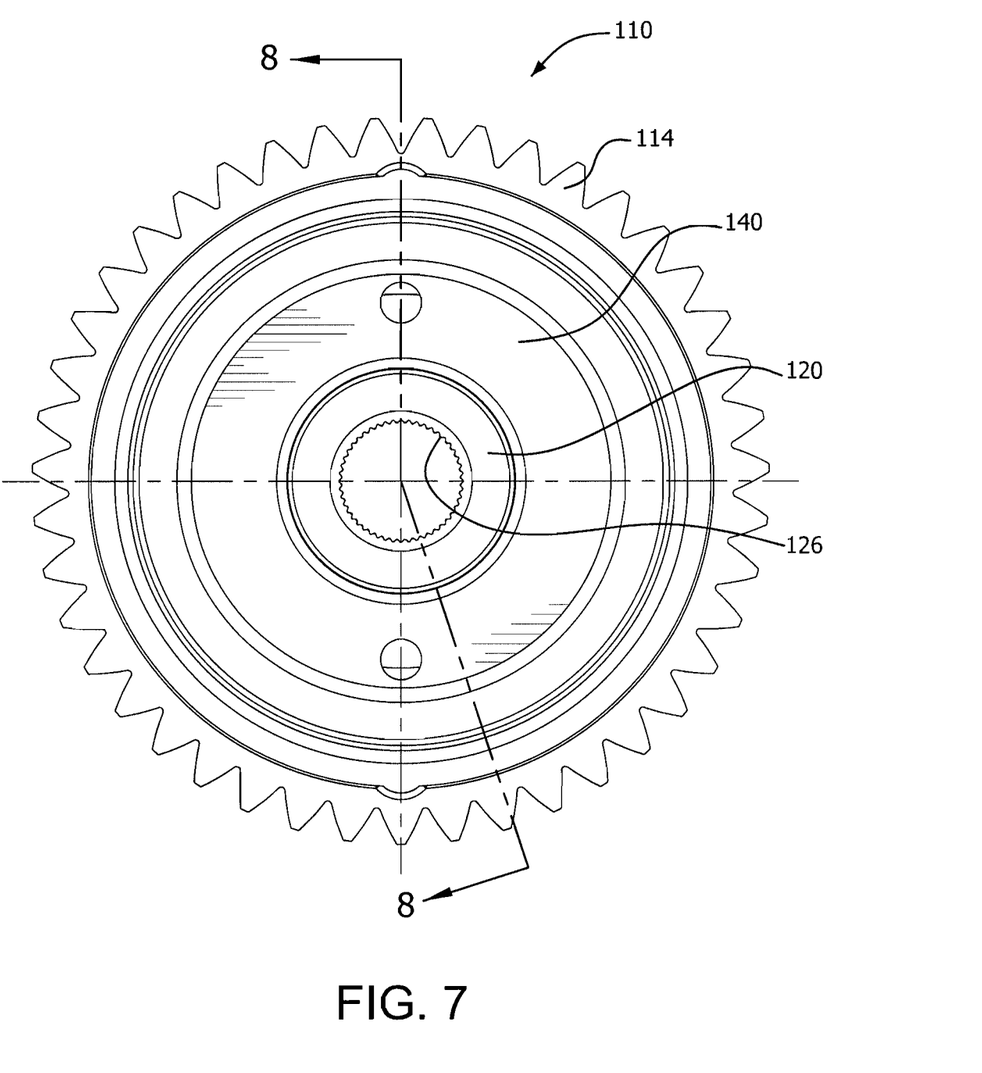
FIG. 7 is an end view of the clutch of FIG. 6.
Figure 8:
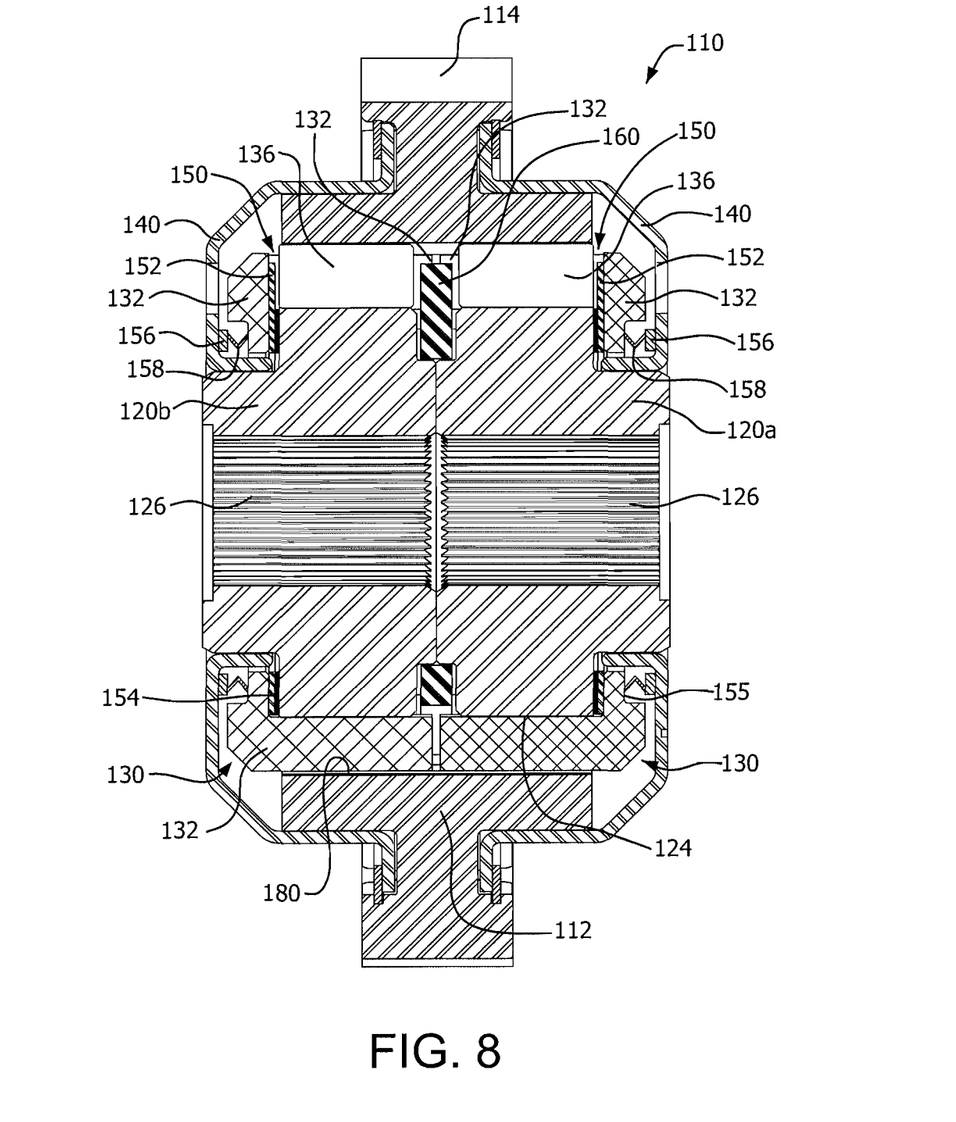
FIG. 8 is a cross-sectional view of the clutch of FIG. 7, taken along section 8-8.

Another embodiment of a bi-directional overrunning clutch 110 is shown in FIGS. 6-8. The clutch 110 includes a housing 112 and a gear 114 affixed to the housing 112. The gear 114 is adapted to be engaged with an external drive mechanism that imparts rotational movement to the gear 114 and thus to the housing 112. Although not specifically depicted, the housing 112 includes substantially cylindrical inner surface 180 having a plurality of inner cam surfaces including forward and reverse cam surfaces, as described previously.

As shown in FIG. 8, a pair of hubs 120 is located within the housing 112. The hubs 120 are substantially coaxially aligned with each other within the housing 112, and are each adapted to rotate about their common axis within the housing 112. Each hub 120 has a substantially cylindrical outer surface 124 having a diameter smaller than the diameter of the inner surface 180 of the housing 112, so that an annular space is formed between the outer surface 124 of the hubs 120 and the inner surface of the housing 112. Each hub 120 has an internal bore 126 into which a portion of a primary drive axle shaft is received. In the depicted embodiment, the internal bores 126 include splines to allow the shafts to move axially inward and outward with respect to the hubs 120 while ensuring that each shaft will rotate along with its respective hub 120. In other embodiments, other mechanical connections between each shaft and its respective hub 120 may be used to ensure rotational coupling.

A pair of roller assemblies 130 is located within the housing 112, with a portion of each roller assembly 130 being situated in the annular space between the outer surface 124 of one of the hubs 120 and the inner surface 180 of the housing 112. Each roller assembly 130 includes a roll cage 132 formed in a substantially cylindrical shape. Each roll cage 132 corresponds to one of the hubs 120 and has a set of slots 134 spaced around the circumference of the roll cage 132. Each slot 134 is adapted to receive a cylindrical roller 136. Collectively, the slots 134 of one roll cage 132 position a plurality of rollers 136 in the annular space between the first hub 120a and the inner cam surface of the housing 112, and the slots 134 of the other roll cage 132 position a plurality of rollers 136 in the annular space between the second hub 120b and the inner cam surface of the housing 112. In one embodiment, each set of rollers 136 has ten rollers, it being understood that any number of rollers greater than or equal to three may be used. As shown, each roller 136 is substantially cylindrical, but rollers of other shapes may be used, including but not limited to substantially spherical rollers.

The rollers 136 surrounding each hub 120 are adapted to be wedgingly engaged between the hub 120 and the inner cam surface of the housing 112 when one of the hubs 120 and the housing 112 is rotated with respect to the other. In particular, when the housing 112 is rotationally driven by an external drive mechanism at a speed faster than the hubs 120 are rotating, the rollers 136 wedgingly engage forward cam surfaces in the housing and the outer surfaces 124 of the hubs 120, causing the hubs 120 to rotate with the housing 112. Similarly, when the drive shafts and hubs 120 are both rotating faster than the housing 112, such as during a descent, the hubs 120 cause the rollers 136 to engage with the reverse cam surfaces, resulting in a back driving or engine brake effect, when available.

To prevent potential reverse engagement of one hub 120 while the other hub 120 is in forward engagement, the clutch 110 includes a roll cage intermittent coupler 160 positioned between the two roll assemblies 130, as shown in FIG. 8. The coupler 160 includes a hub with a plurality of teeth extending radially outward from the hub. The number of teeth preferably matches the number of slots 134 and the number of rollers 136 in each roll cage 132, although there could be less teeth. As discussed above with respect to the prior embodiment, the teeth of the coupler 160 have a width that is less than the width of the slots 134 so as to define a gap that permits indexing of one cage relative to the other.

An end cap 140 is attached to or disposed about each end of the housing 112 and may rotate with the housing 112. To assist in indexing the roll cage assemblies 130 to their corresponding hubs 120, a friction disk mechanism 150 is located between each end cap 140 and its associated roll cage assembly 130. Each friction disk mechanism 150 urges its corresponding roll cage assembly 130 to frictionally engage with the corresponding hub 120 so that the roll cages 132 rotate with the hubs 120 when both hubs rotate.

Each friction disk mechanism 150 is similar to the friction disk mechanism 50 described above and includes a friction plate 152 that engages with a contact surface 154 on the hub 120. A bearing 156 is disposed between one end of a spring 158 and an inner surface of the end cap 140. The other end of the spring 158 contacts an outer surface 155 on the roll cage 132. As such, the two roll cages 132 are biased toward one another, forcing the friction plates 152 into contact with the contact surfaces 154. The spring 158 is preferably a wave spring, although other springs and or elastomers can be used. The bearing 158 may include one or more low friction surfaces as discussed above.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A bi-directional overrunning clutch comprising:
   a housing adapted to be engaged with and rotated by a drive mechanism, the housing including an inner cam surface;
   a pair of hubs substantially coaxially aligned with each other within the housing and adapted respectively to engage first and second shafts of a primary drive axle;
   a respective roller assembly associated with each hub, each roller assembly including a roll cage having a set of slots positioning a plurality of rollers in an annular space between the associated hub and the inner cam surface of the housing, the rollers being spaced about the associated hub and adapted to wedgingly engage between the hub and the inner cam surface when one of the associated hub and the housing is rotated with respect to the other of the associated hub and the housing;
   a pair of end caps each associated with a respective one of the hubs and attached at a respective end of the housing;

a friction disk mechanism associated with each hub and roller assembly for indexing the roller assembly relative to the hub, each friction disk mechanism including a friction plate engaged with or formed on the roll cage so as to rotate in combination with the roll cage and positioned to contact a contact surface on the hub during operation, and a spring compressed between the end cap and the roll cage for biasing the friction plate into frictional contact with the contact surface of the hub; and a roll cage intermittent coupler located between the roll cages, the coupler configured to engage the roll cages so as to permit indexing of one roll cage relative to the other;

wherein the inner cam surface has a forward cam surface and a reverse cam surface, such that when the housing is being driven with respect to at least one of the hubs, the rollers wedgingly engage between the forward cam surface and the at least one hub; and wherein when one of the hubs is overrunning by rotating faster than the housing and the other of the hubs, the roll cage coupler configured to prevent the roll cage associated with the overrunning hub from rotating with the overrunning hub, thereby limiting the ability of the rollers to engage between the reverse cam surface of the housing and the one hub.

2. The overrunning clutch of claim 1, wherein the spring is a wave spring.

3. The overrunning clutch of claim 1, further comprising a bearing surface on the end cap, the spring having an end that bears against the bearing surface.

4. The overrunning clutch of claim 3, wherein the bearing surface includes a low friction surface in contact with the end of the spring, wherein the low friction surface has lower friction than a surface in frictional contact with the hub.

5. The overrunning clutch of claim 1, wherein the roll cage coupler includes one or more radially extending teeth that each engage with one of the slots in each of the roll cages.

6. The overrunning clutch of claim 1, wherein the coupler includes a coupler hub with radially extending coupler teeth, each coupler tooth having a length and width designed to position the coupler tooth in a corresponding slot in both cages, the width of the coupler tooth being less than the width of the associated slots so as to define a gap that permits one roll cage to index with respect to the other roll cage and the coupler tooth.

7. The overrunning clutch of claim 6, wherein the gap is sized so that one roll cage can index so as to position its rollers to engage with one of either the forward and rear cam surfaces, while the coupler teeth prevent the other roll cage from indexing in the other direction thereby preventing its rollers from engaging with the other of either the forward and rear cam surfaces.

8. A bi-directional overrunning clutch comprising:

a housing adapted to be engaged with and rotated by a drive mechanism, the housing including an inner cam surface;

a first hub and a second hub substantially coaxially aligned with each other within the housing;

a first roll cage having a set of slots positioning a plurality of rollers in an annular space between the first hub and the inner cam surface of the housing, and a second roll cage having a set of slots positioning a plurality of rollers in an annular space between the second hub and the inner cam surface of the housing, the rollers being spaced about an associated hub to wedgingly engage between the hub and the inner cam surface when one of the hub and the housing is rotated with respect to the other of the hub and the housing;

a first end cap attached to the housing adjacent to the first hub and a second end cap attached to the housing adjacent to the second hub;

a first friction disk mechanism engaging the first roll cage for indexing the first roll cage relative to the first hub, the first friction disk mechanism including a first friction plate engaged with or formed on the first roll cage so as to rotate in combination with the first roll cage and positioned to contact a contact surface of the first hub during operation, and a first spring compressed between the first end cap and the first roll cage for biasing the friction plate into frictional contact with the contact surface of the first hub;

a second friction disk mechanism engaging the second roll cage for indexing the second roll cage relative to the second hub, the second friction disk mechanism including a second friction plate engaged with or formed on the second roll cage so as to rotate in combination with the second roll cage and positioned to contact a contact surface on the second hub during operation, and a second spring compressed between the second end cap and the second roll cage for biasing the second friction plate into frictional contact with the contact surface of the second hub; and a roll cage intermittent coupler located between the first and second roll cages, the coupler configured to engage the roll cages so as to permit indexing of one roll cage relative to the other while enabling each roll cage to move axially with respect to its associated hub.

9. The overrunning clutch of claim 8, wherein the coupler includes a coupler hub with radially extending coupler teeth, each coupler tooth having a length and width designed to position the coupler tooth in a corresponding slot in both cages, the width of the coupler tooth being less than the width of the associated slots so as to define a gap that permits one roll cage to index with respect to the other roll cage and the coupler tooth.

10. The overrunning clutch of claim 9, wherein the gap is sized so that one roll cage can index so as to position its rollers to engage with one of either the forward and rear cam surfaces, while the coupler teeth prevent the other roll cage from indexing in the other direction thereby preventing its rollers from engaging with the other of either the forward and rear cam surfaces.

11. The overrunning clutch of claim 8, wherein the first and second springs are wave springs.

12. The overrunning clutch of claim 8, further comprising first and second bearing surfaces on the first and second end caps, respectively, the first and second springs each having an end that bears against the corresponding bearing surfaces.

13. In a bi-directional overrunning clutch including a housing adapted to be engaged with and rotated by a drive mechanism, the housing having an inner cam surface; a first hub and a second hub substantially coaxially aligned with each other within the housing; first and second roll cages each having a set of slots positioning a plurality of rollers in an annular space between the first and second hubs, respectively, and the inner cam surface of the housing, the rollers being spaced about an associated hub to wedgingly engage between the hub and the inner cam surface when one of the hub and the housing is rotated with respect to the other of the hub and the housing; and first and second end caps attached to the housing adjacent to the first and second hubs, respectively, an indexing assembly comprising:

first and second friction disk mechanisms for indexing the first roll cage relative to the first hub and the second roll cage relative to the second hub, respectively, each friction disk mechanism comprising:

a friction plate engaged with or formed on the roll cage so as to rotate in combination with the roll cage and positioned to contact a bearing surface of the hub during operation; and a spring compressed between the end cap and the roll cage for biasing the friction plate into frictional contact with the contact surface hub; and a roll cage intermittent coupler located between the first and second roll cages, the coupler configured to engage the roll cages so as to permit indexing of one roll cage relative to the other while enabling each roll cage to move axially with respect to its associated hub.

14. The indexing assembly of claim 13, wherein the coupler includes a coupler hub with radially extending coupler teeth, each coupler tooth having a length and width designed to position the coupler tooth in a corresponding slot in both cages, the width of the coupler tooth being less than the width of the associated slots so as to define a gap that permits one roll cage to index with respect to the other roll cage and the coupler tooth.

15. The overrunning clutch of claim 14, wherein the gap is sized so that one roll cage can index so as to position its rollers to engage with one of either the forward and rear cam surfaces, while the coupler teeth prevent the other roll cage from indexing in the other direction thereby preventing its rollers from engaging with the other of either the forward and rear cam surfaces.

16. The indexing assembly of claim 14, the friction disk mechanism each further comprising a bearing surface on the corresponding end cap, each spring having an end that bears against the corresponding bearing surface.

* * * * *